(12) United States Patent
Nandalochana et al.

(10) Patent No.: US 10,329,005 B2
(45) Date of Patent: Jun. 25, 2019

(54) AIRCRAFT COMPRESSION RELIEF ROD

(71) Applicant: THE BOEING COMPANY, Chicago, IL (US)

(72) Inventors: Chathura B. Nandalochana, Everett, WA (US); Mark E. Wentland, Lynnwood, WA (US); Joel A. Bruhns, Seattle, WA (US); James W. Hoskinson, Arlington, WA (US); Brendon T. Rippe, Everett, WA (US); Curtis Wen, Shoreline, WA (US); Mona T. Tafesh, Maple Valley, WA (US)

(73) Assignee: THE BOEING COMPANY, Chicago, IL (US)

( * ) Notice: Subject to any disclaimer, the term of this patent is extended or adjusted under 35 U.S.C. 154(b) by 357 days.

(21) Appl. No.: 15/096,988

(22) Filed: Apr. 12, 2016

(65) Prior Publication Data
US 2017/0291675 A1 Oct. 12, 2017

(51) Int. Cl.
*B64C 1/06* (2006.01)
*B64D 11/00* (2006.01)
*B64D 11/02* (2006.01)
*B64D 11/04* (2006.01)
*B64C 1/08* (2006.01)

(52) U.S. Cl.
CPC ............... *B64C 1/06* (2013.01); *B64C 1/08* (2013.01); *B64D 11/00* (2013.01); *B64D 11/003* (2013.01); *B64D 11/02* (2013.01); *B64D 11/04* (2013.01)

(58) Field of Classification Search
CPC .. B64C 1/06; B64C 1/08; B64D 11/04; B64D 11/003; B64D 11/00; B64D 11/02
See application file for complete search history.

(56) References Cited

U.S. PATENT DOCUMENTS

| 1,843,364 | A | * | 2/1932 | Hoekstra | B64C 3/00 403/174 |
|---|---|---|---|---|---|
| 3,044,477 | A | * | 7/1962 | Higgins | E04H 15/28 135/22 |
| 4,955,742 | A | * | 9/1990 | Marks | B64G 9/00 403/246 |
| 6,536,710 | B1 | | 3/2003 | Bobzien et al. | |
| 8,387,917 | B1 | * | 3/2013 | Grip | B64C 1/22 244/118.1 |

(Continued)

OTHER PUBLICATIONS

Canale etal. "Overview of factors contributing to steel spring performance and failure" (Year: 2007).*

(Continued)

*Primary Examiner* — Assres H Woldemaryam
(74) *Attorney, Agent, or Firm* — Patterson + Sheridan, LLP

(57) ABSTRACT

A tension-only member for a truss structure and a method of operating a vehicle with tension-only members is provided. Tension-only members readily deform when a compressive load is applied. The tension-only members may be a leaf spring, a strap, a cable, or a rope between two connector ends. The tension-only members are placed diagonally in a truss such that the tension-only members support a load applied in one direction but deflect when a load is applied in an opposite direction. A truss structure with such tension-only members can be flexible to enable a vehicle frame to which it is attached to flex.

11 Claims, 8 Drawing Sheets

(56) References Cited

U.S. PATENT DOCUMENTS

| | | | | |
|---|---|---|---|---|
| 2002/0179772 A1* | 12/2002 | Ohmer | ................... | B64C 1/061 |
| | | | | 244/119 |
| 2004/0211140 A1* | 10/2004 | Suzuki | ..................... | E04B 1/24 |
| | | | | 52/393 |
| 2006/0107611 A1* | 5/2006 | Merrifield | ............. | B64G 1/222 |
| | | | | 52/646 |
| 2007/0044415 A1* | 3/2007 | Merrifield | ............ | E04B 1/3441 |
| | | | | 52/633 |
| 2008/0184653 A1* | 8/2008 | Bauman | ................... | E04C 3/32 |
| | | | | 52/651.01 |
| 2008/0272236 A1* | 11/2008 | Rawdon | ................... | B64C 1/08 |
| | | | | 244/118.1 |
| 2010/0269446 A1 | 10/2010 | Merrifield | | |
| 2013/0075529 A1* | 3/2013 | Marcoe | ................... | B32B 1/08 |
| | | | | 244/131 |
| 2014/0251768 A1* | 9/2014 | Miles | .................... | B65G 21/06 |
| | | | | 198/860.1 |
| 2014/0263836 A1* | 9/2014 | Guillemaut | ............... | B64C 1/26 |
| | | | | 244/131 |
| 2015/0344156 A1* | 12/2015 | Vail, III | ................... | B64F 5/60 |
| | | | | 701/32.8 |

OTHER PUBLICATIONS

Extended European Search Report for application No. 17154105.5-1754 dated Aug. 1, 2017.

\* cited by examiner

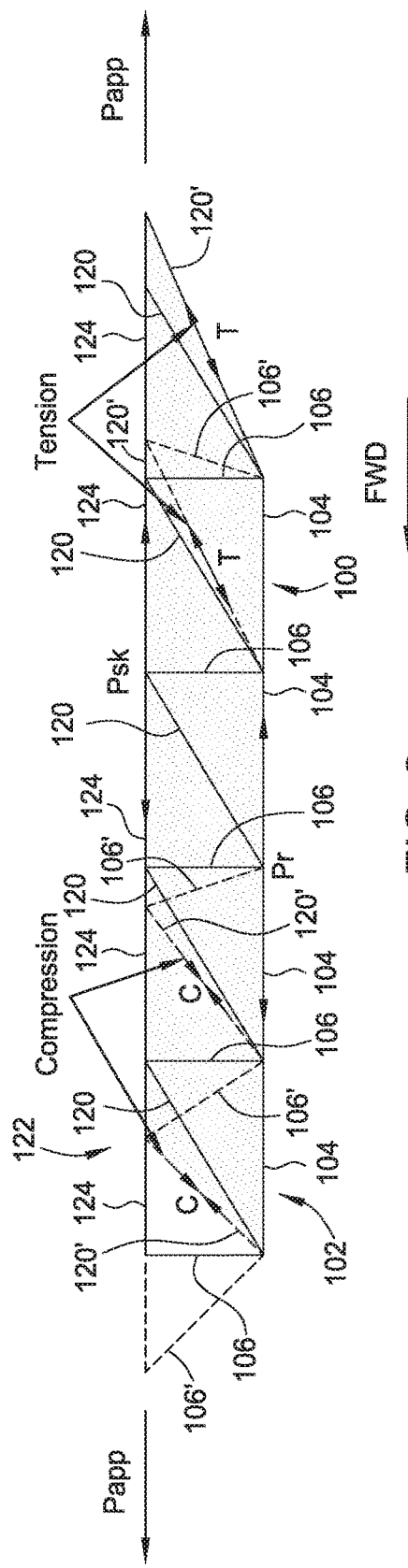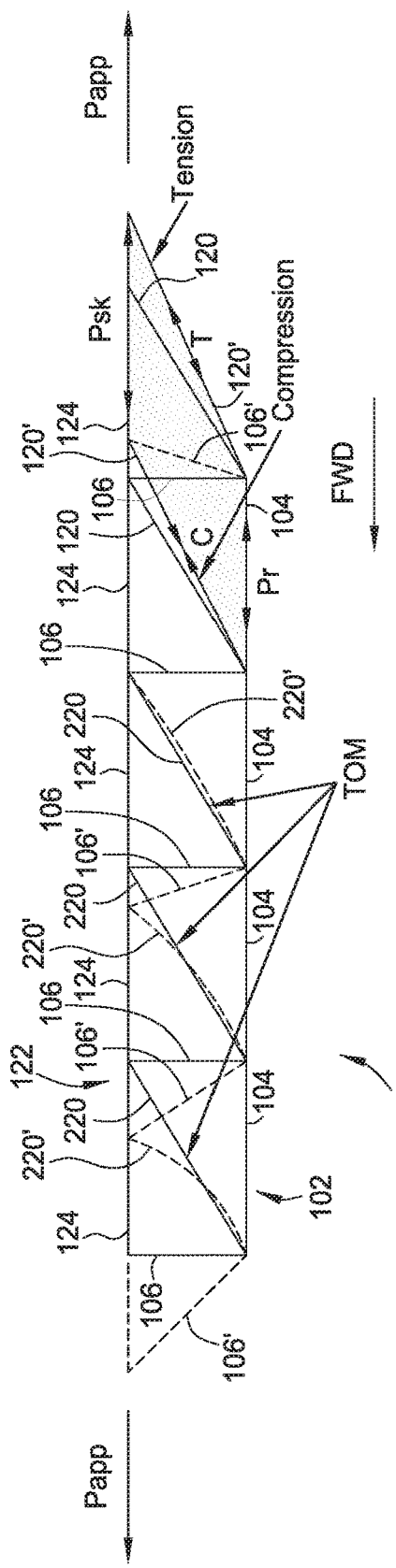

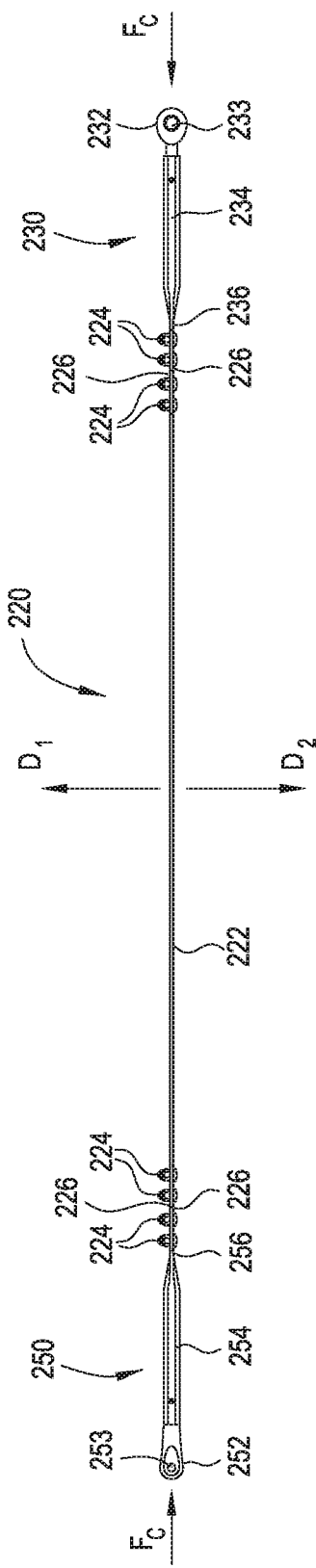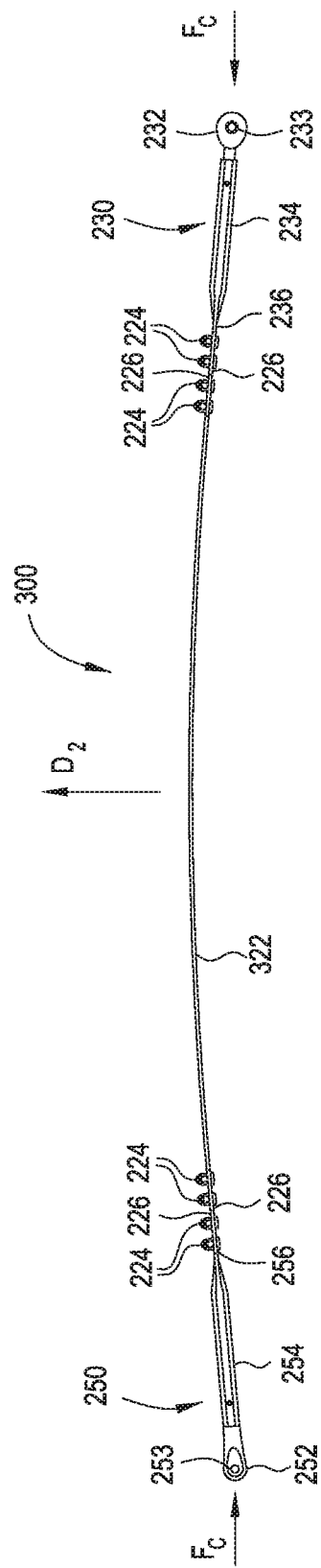

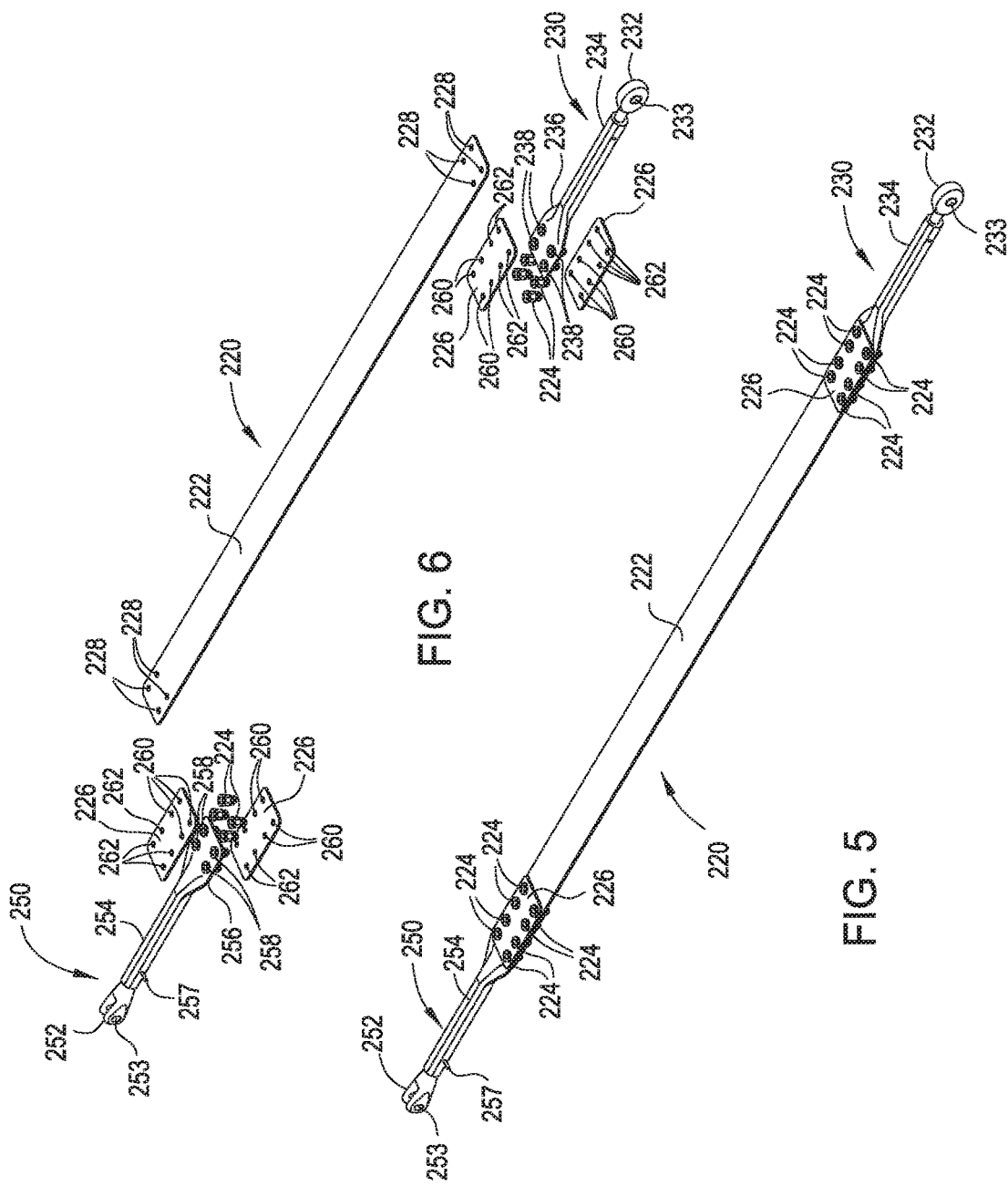

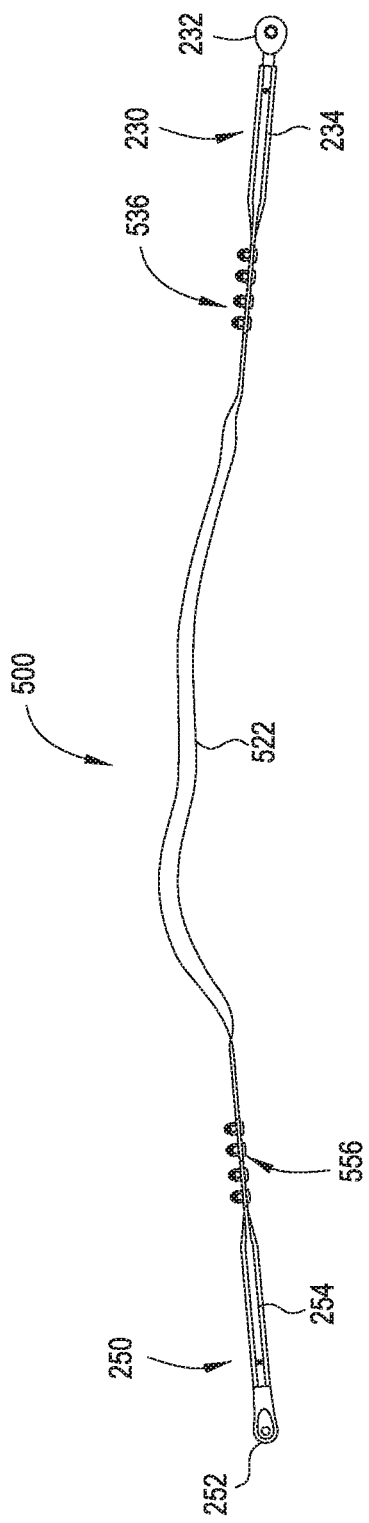

US 10,329,005 B2

AIRCRAFT COMPRESSION RELIEF ROD

BACKGROUND

Truss structures can be used in vehicles, such as aircraft, boats, trucks, and buses to support loads or structures in a vehicle. For example, a truss supported by frame members in an aircraft may support lavatories, galleys, overhead storage bins, partitions, and other monuments. The trusses include various truss tie rods to support the structure(s), including vertical tie rods that support the weight of the structure(s), lateral tie rods that support lateral loads on the structure(s), and diagonal tie rods that support forward and aft loads on the structure(s). In various instances, a truss structure could impart loads into the structure of a vehicle. For example, an airframe of an aircraft may be designed to flex when it encounters turbulence. However, a truss that is connected to the airframe could prevent or inhibit such flexing.

SUMMARY

According to one aspect, a support member for a truss includes a first connector end and a second connector end. The support member also includes a tension-only connector arranged between the first and second connector ends. The tension-only connector comprises a leaf spring.

According to one aspect, a truss support structure includes an upper support rail, a lower support rail, and at least two vertical tie rods connecting the upper support rail and the lower support rail. The truss support structure also includes a diagonal tie rod. A first end of the diagonal tie rod is connected to the lower support rail proximal to the connection of a first vertical tie rod of the at least two vertical tie rods with the lower support rail. A second end of the diagonal tie rod extends away from the first vertical tie rod and is connected to the upper support rail. The truss support structure also includes a tension-only member. The tension-only member includes a first connector end, a second connector end, and a tension-only connector. The tension-only connector is arranged between the first and second connector ends. The tension-only member is arranged between the first vertical tie rod and a second vertical tie rod of the at least two vertical tie rods. The first connector end of the tension-only member is connected to the lower support rail proximal to the connection of the second vertical tie rod with the lower support rail. The second connector end of the tension-only member extends away from the second vertical tie rod and is connected to the upper support rail between the connection of the first and second vertical tie rods with the upper support rail.

According to one aspect, a method of operating a vehicle includes providing a truss support structure in a vehicle. The truss support structure includes an upper support rail, a lower support rail, and at least two vertical tie rods connecting the upper support rail and the lower support rail. The truss support structure also includes a diagonal tie rod. A first end of the diagonal tie rod is connected to the lower support rail proximal to the connection of a first vertical tie rod of the at least two vertical tie rods with the lower support rail. A second end of the diagonal tie rod extends away from the first vertical tie rod and is connected to the upper support rail. The truss support structure also includes a tension-only member. The tension-only member includes a first connector end, a second connector end, and a tension-only connector arranged between the first and second connector ends. The tension-only member is arranged between the first vertical tie rod and a second vertical tie rod of the at least two vertical tie rods. The first connector end of the tension-only member is connected to the lower support rail proximal to the connection of the second vertical tie rod with the lower support rail. The second connector end of the tension-only member extends away from the second vertical tie rod and is connected to the upper support rail between to the connection of the first and second vertical tie rods with the upper support rail. The method also includes operating the vehicle.

BRIEF DESCRIPTION OF ILLUSTRATIONS

FIG. 2 is a simplified line drawing of the truss structure of FIG. 1 with loads applied to the truss, wherein greatly exaggerated positions of truss tie rods are shown in broken line;

FIG. 4 is a side view of a tension-only truss member according to one aspect;

FIG. 5 is a perspective view of the tension-only truss member of FIG. 4;

FIG. 6 is a perspective exploded view of the tension-only member of FIG. 4;

FIG. 7 is a side view of a tension-only truss member according to a second aspect;

FIG. 10 is a simplified line drawing of the truss structure of FIG. 3 with loads applied to the truss, wherein greatly exaggerated positions of truss members and tie rods are shown in broken line;

FIG. 12 is a side view of a tension-only truss member according to a third aspect.

DETAILED DESCRIPTION

In the following, reference is made to aspects presented in this disclosure. However, the scope of the present disclosure is not limited to specific described aspects. Instead, any combination of the following features and elements, whether related to different aspects or not, is contemplated to implement and practice contemplated aspects. Furthermore, although aspects disclosed herein may achieve advantages over other possible solutions or over the prior art, whether or not a particular advantage is achieved by a given aspect is not limiting of the scope of the present disclosure. Thus, the following aspects, features, and advantages are merely illustrative and are not considered elements or limitations of the appended claims except where explicitly recited in a claim(s). Likewise, reference to "the invention" or "the disclosure" shall not be construed as a generalization of any inventive subject matter disclosed herein and shall not be considered to be an element or limitation of the appended claims except where explicitly recited in a claim(s).

In aspects described herein, certain truss support tie rods of a truss structure that support forward and aft loads are replaced with tension-only members. As used herein, the term "tension-only members" refers to a truss member that readily buckles under significant compressive loads. For example, such a tension-only member may begin to buckle under compressive loads of one pound, five pounds, ten pounds, or any load deemed suitably insignificant for a particular application of a truss compared to surrounding structure. The use of tension-only members provides a truss structure that can flex with frame members of the vehicle to which it is attached.

Figure 1:
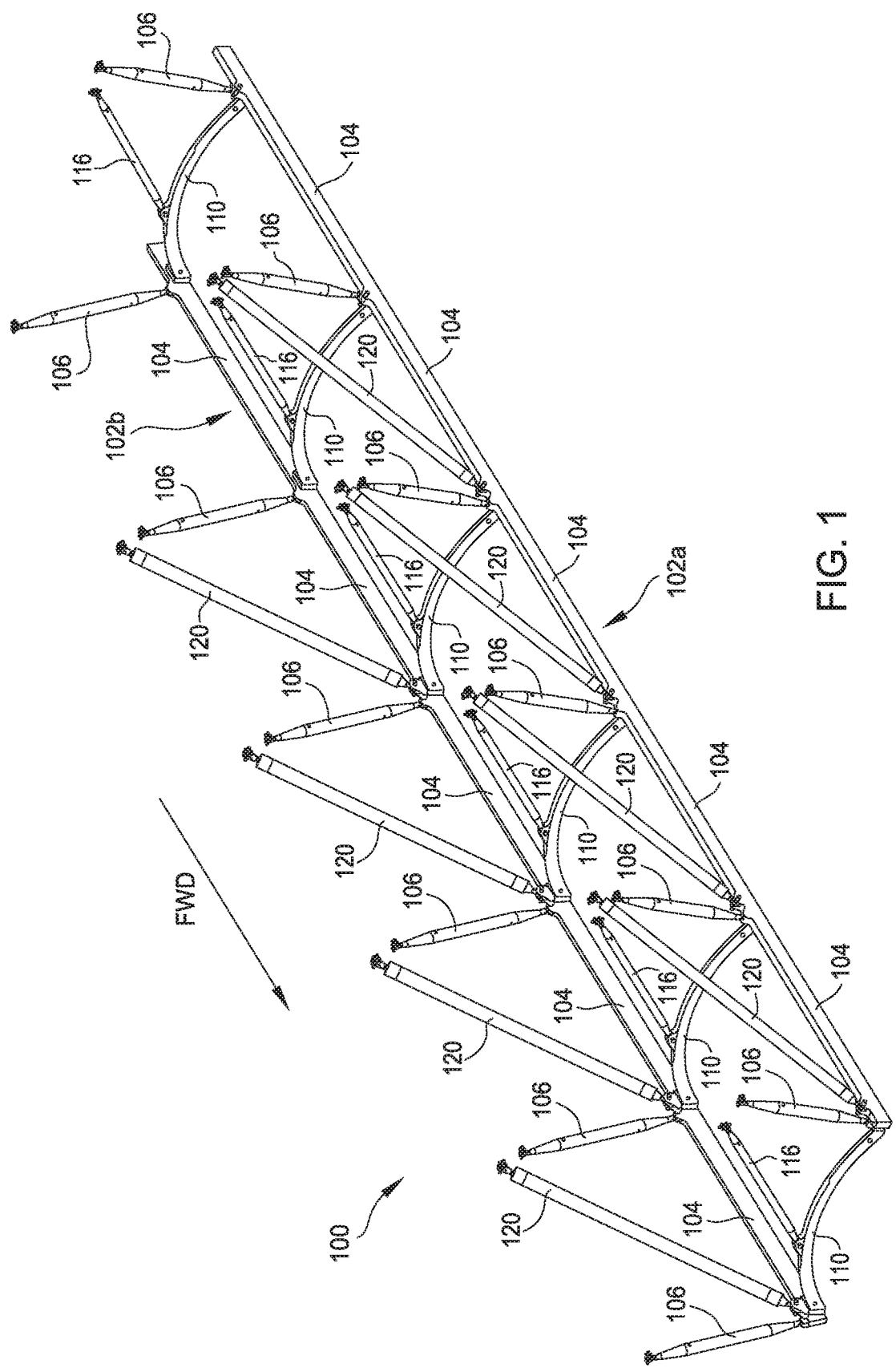
FIG. 1 is a perspective view of an existing truss structure.

FIG. 1 illustrates an existing truss structure 100. The truss structure 100 includes lower support rails 102 that various structures can be attached to. For example, in an aircraft cabin, various monuments such as lavatories, galleys, closets, partitions, and overhead storage compartments can be attached to the lower support rails. The truss structure 100 has a first support rail 102a and a second support rail 102b spaced apart laterally from one another. The first support rail 102a and the second support rail 102b are connected to each other by cross members 110. The truss structure 100 includes various members that connect the lower rails 102 and the cross members 110 to upper rails and/or frame members of a vehicle. The truss structure 100 includes vertical tie rods 106 that support the weight of various monuments attached to the truss structure 100 and also any vertical acceleration loads (e.g., movement in turbulence) on the monuments. The truss structure 100 also includes lateral tie rods 116 that support lateral loads on the monuments. The lateral tie rods 116 are connected at a lower end to the cross members 110. The truss structure 100 also includes diagonal tie rods 120 that support forward and aft loads on the monuments, such as acceleration and deceleration loads.

The truss structure 100 can be modular. For example, each of the lower support rails 102a and 102b is made up of multiple lower rail segments 104. Illustratively, FIG. 1 shows ten lower rail segments 104, five lower rail segments 104 for each of the lower support rails 102a and 102b. Each lower rail segment 104 is connected to a vertical tie rod 106 and to a diagonal tie rod 120. Truss structures 100 of different length can be constructed by using different numbers of lower rail segments 104 (and vertical tie rods 106, lateral tie rods 116, and diagonal tie rods 120).

FIG. 2 is a simplified line drawing of the truss structure 100 wherein the vertical tie rods 106 and the diagonal tie rods 120 are connected to upper support rails 122. In an airplane or other vehicle, the upper support rails 122 could be omitted and the tie rods 120 could connect directly to the frame and/or skin of the vehicle instead. In such an instance, the frame and/or skin of the vehicle could take the place of the upper support rails 122. The upper support rails 122 are made up of multiple upper rail segments 124 (much like the lower support rails 102a and 102b are made up of lower rail segments 104). In the event that a vehicle in which the truss structure 100 is installed is flexing (as indicated by arrows Papp), deflections in the truss structure 100 results in loads that could be applied to the frame of the vehicle. For example, the stretching of the vehicle results in a load Psk applied to the upper support rails 122 and a load Pr applied to the lower support rails 102. The stretching also results in compressive loads applied to the diagonal tie rods 120 on the left-hand side of the truss structure 100 (as indicated by the arrows C) and tensile loads applied to the diagonal tie rods 120 on the right-hand side of the truss structure 100 (as indicated by the arrows T). These various loads also result in at least some of the diagonal tie rods 120 and the vertical tie rods 106 being displaced (as indicated by the broken lines). In various circumstances, the load Psk applied to the upper support rails 122 could be transferred to the frame of the vehicle. In aspects in which the upper support rails 122 are omitted (e.g., when the frame and/or the skin of an aircraft are directly attached to the tie rods), the load Psk is transmitted directly to the frame and/or skin of the vehicle.

Figure 3:
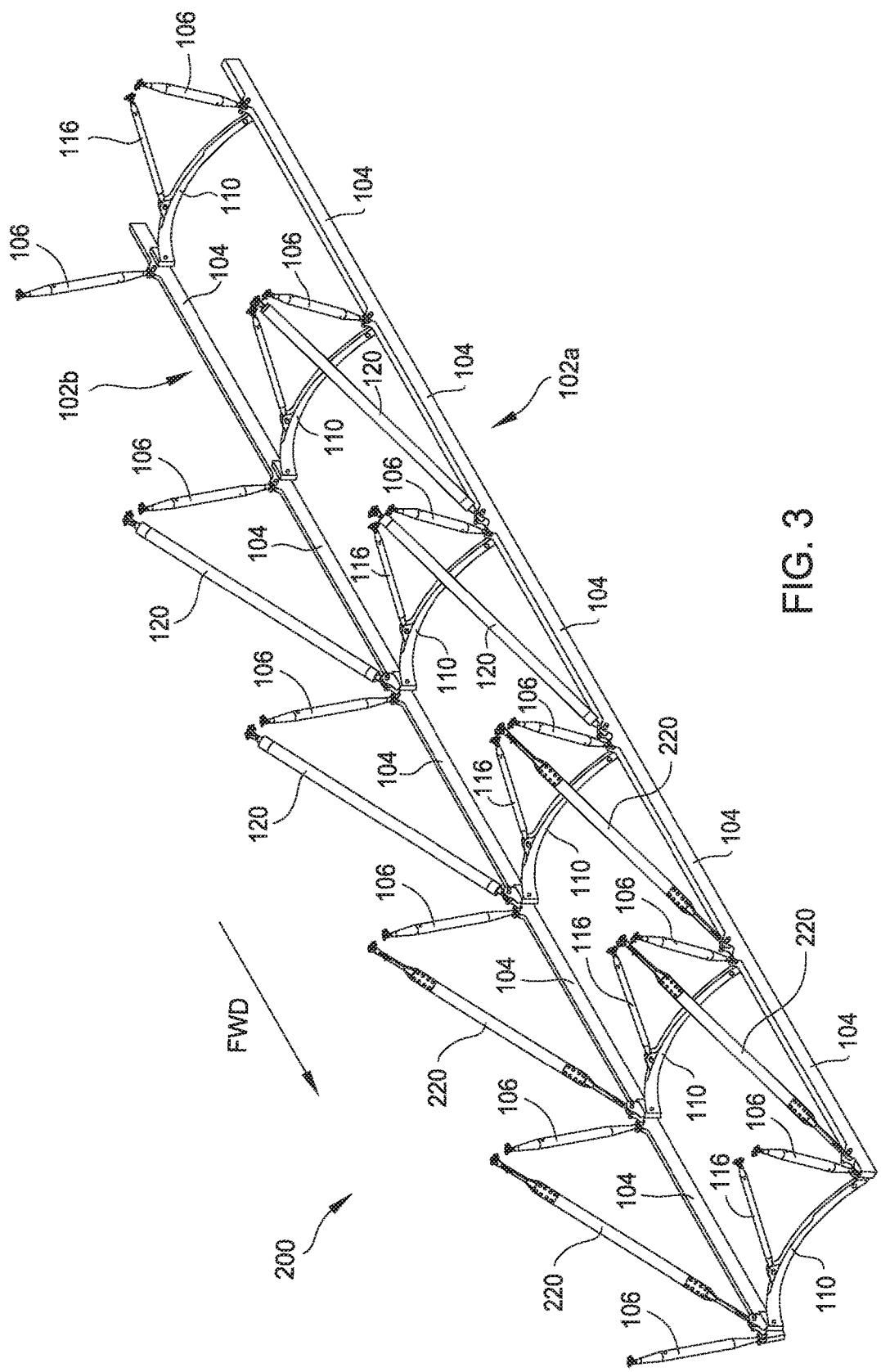
FIG. 3 is a perspective view of an truss structure according to one aspect.

FIG. 3 illustrates a truss structure 200 in which some of the diagonal tie rods 120 have been replaced with tension-only members 220. As discussed above, tension-only members 220 support tension loads in the truss structure 200 (i.e., pulling forces) but readily deform and thereby offer little support under compressive loads. The truss structure 200 illustrated in FIG. 3 includes two sets of diagonal tie rods 120 and two sets of tension-only members 220. As discussed above, the diagonal tie rods 120 support forward and aft loads imparted on the truss structure 200. In many instances, loads in the forward direction are typically several times larger than loads in the aft direction. For example, in an aircraft, loads experienced during takeoff and climb are typically lower than loads experienced during landing because the decelerations during landing are stronger than the accelerations during takeoff, for example. As a result, the truss structure 200 may only include one or two sets of diagonal tie rods 120, which can support the smaller aft loads, and use additional tension-only members 220, which can support the larger forward loads in combination with the diagonal tie rods 120.

FIGS. 4-6 illustrate one of the tension-only members 220 from the truss structure 200 illustrated in FIG. 3. The tension-only member 220 includes a leaf spring 222 arranged between a first connector end 230 and a second connector end 250. The first connector end 230 includes a shank 234 with a lug end 232 arranged in an end of the shank 234. For example, the end of the shank 234 could include internal female threads and the lug end 232 could include male threads that can threadingly engage the female threads of the shank 234. The second connector end 250 includes a shank 254 with a clevis end 252 arranged in an end of the shank 254. For example, the end of the shank 254 may include internal female threads and the clevis end 252 could include male threads that can threadingly engage the female threads of the shank 254. A distance between the lug end 232 and the clevis end 252 for the tension-only member 220 can be adjusted by adjusting the amount of threading engagement between the threads of the shanks 234 and 254 and the lug end 232 and clevis end 252, respectively. In various aspects, retention pins, such as cotter pins and the like, can be inserted into the shanks to hold the lug end 232 and the clevis end 252 therein and prevent rotation of the lug end 232 or clevis end 252 relative to the respective shanks 234 and 254. For example, with reference to FIGS. 5 and 6, a retention pin 257 is shown partially extending from the shank 254 of the second connector end 250. The retention pin 257 can be inserted fully into the shank 254 and holes or slots in the clevis end 252 to retain and/or prevent rotation of the clevis end 252 in the shank 254. A similar retention pin can retain and/or prevent rotation of the lug end 232 in the shank 234. In at least one alternative aspect, the lug end 232 and the clevis end 252 may be monolithic with their respective shanks 234 and 254 such that a distance between the lug end 232 and the clevis end 252 is non-adjustable.

FIGS. 5 and 6 illustrate perspective views of the tension-only member 220. The leaf spring 222 is substantially rectangular in shape and relatively flat, meaning its cross-sectional width is substantially greater than its cross-sectional thickness. In one aspect, the leaf spring is made of stainless steel, aluminum, titanium, or another metal or metal alloy. In another aspect, the leaf spring is made of a composite material, such as a carbon fiber reinforced plastic. The shanks 234 and 254, lug end 232, and clevis end 252 of the connector ends 230 and 250 can be made of steel, aluminum, titanium, or another metal or metal alloy.

As best shown in FIG. 6, the shanks 234 and 254 include flattened portions 236 and 256, respectively, at ends opposite the lug end 232 and the clevis end 252, respectively. The flattened portions 236 and 256 can be arranged end-to-end with ends of the leaf spring 222 such that the flattened portions 236 and 256 and the leaf spring 222 are aligned. The flattened portions 236 and 256 and the ends of the leaf spring 222 are connected with splice plates 226. FIGS. 4-6 illustrate splice plates 226 on either side of each of the flattened portions 236 and 256 and the ends of the leaf spring 222. The splice plates 226 are connected to the flattened portions 236 and 256 and the ends of the leaf spring 222 with fasteners 224, such as rivets or bolts. Referring to FIG. 6, ends of the leaf spring 222 include four holes 228 therethrough. Similarly, the flattened portions 236 and 256 each include four holes 238 and 258, respectively, therethrough. Each of the splice plates 226 includes eight holes there through. A first four of the eight holes 260 of a splice plate 226 are aligned with the four holes 228 in an end of the leaf spring 222 and a second four of the eight holes 262 in the splice plate 226 are aligned with the four holes 238 or 258 in the flattened portions 236 or 256 of one of the respective shanks 234 or 254. The fasteners 224 can be installed through the aligned holes to connect the connector ends 230 and 250 to the leaf spring 222.

In one aspect, the splice plates 226 could be integral with the flattened portions 236 and 256 of the shanks 234 and 254. In such an aspect, the ends of the leaf spring 222 could be arranged in a gap formed between the splice plates 226 on either side of a flattened portion and fastened in place with fasteners 224. Such an aspect would reduce the number of fasteners 224 from sixteen to eight for a tension-only member 220 and would also reduce assembly time.

In one aspect, the leaf spring 222 could be connected to the flattened portions 236 and 256, respectively, in a lap joint arrangement such that the splice plates 226 can be omitted. For example, the ends of the leaf spring 222 could overlap with the flattened portions 236 and 256 of the connector ends 230 and 250, respectively, such that the holes 228 in the leaf spring 222 are aligned with the holes 238 and 258 of the flattened portions 236 and 256, respectively. Thereafter, the fasteners 224 can be installed through the aligned holes to connect the connector ends 230 and 250 to the leaf spring 222.

In at least one aspect, the tension-only member 220 could be formed as a unitary body. For example, the leaf spring 222 and the shanks 234 and 254 could be monolithic. For example, the leaf spring 222 and the shanks 234 and 254 could be machined from a metal blank or could be a casting or forging. In at least one aspect, the lug end 232 in the clevis end 252 could threadingly engage threaded ends of the monolithic shanks 234 and 254, as discussed above. In at least one aspect, the lug end 232 and the clevis end 252 could be part of the monolithic structure with the leaf spring 222 and the shanks 234 and 254.

Referring again to FIG. 4, in one aspect, the leaf spring 222 of the tension-only member 220 could be flat. As a result, when a compressive force (indicated by arrows Fc) is applied to the connector ends 230 and 250, the leaf spring 222 could deflect in the direction of arrow D1 or of arrow of D2. In certain scenarios, it may be desirable for the leaf spring 222 to deflect in a particular direction. For example, a tension-only member 220 could be installed close to a wiring bundle, a duct, or other operating structures in an aircraft, and contact between the tension-only member 220 and such operating structures may be undesirable. Referring to FIG. 7, in one aspect, a tension-only member 300 could include a leaf spring 322 with a bowed shape. Such a bowed leaf spring 322 would be biased to deflect in the direction of the bow. For example, in FIG. 7, the bowed leaf spring 322 is biased to deflect in the direction of arrow D2. In various aspects, the leaf spring 322 could have other features for deformation control, such as a kink or a pre-formed arc (e.g., a single bow or a sine wave).

Figure 8:
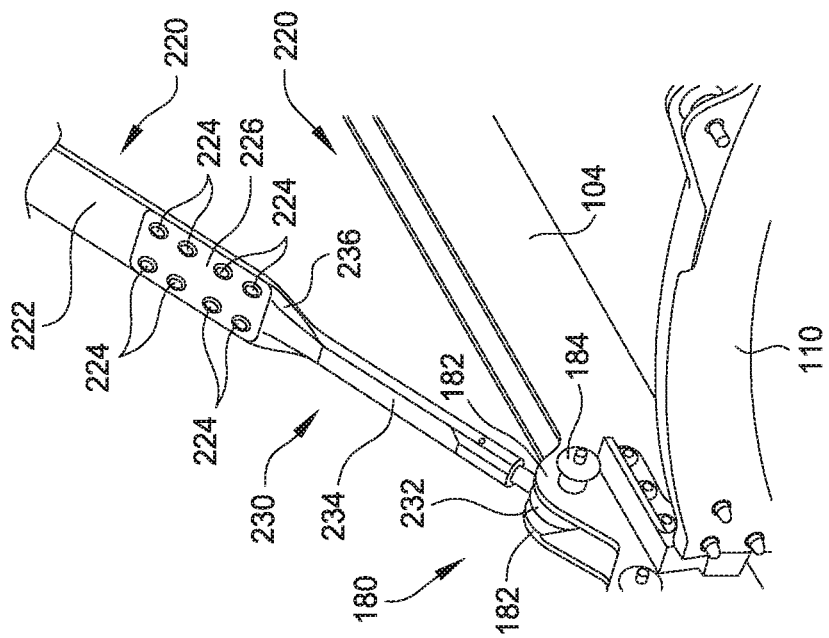
FIG. 8 is a detail perspective view of a lug end of the tension-only member of FIG. 4 engaged with a clevis connection of the truss structure of FIG. 3.

FIG. 8 is a detail perspective view showing the lug end 232 of a tension-only member 220 connected to a lower rail segment 104 of the truss structure 200. The lug end 232 of the first connector end 230 is arranged in a clevis connector 180 on the rail segment 104. The clevis connector 180 includes clevis walls 182. A quick release pin 184 or like fastener (e.g., a cotter pin or a split pin) is inserted through aligned holes to fasten the lug end 232 and the clevis connector 180.

Figure 9:
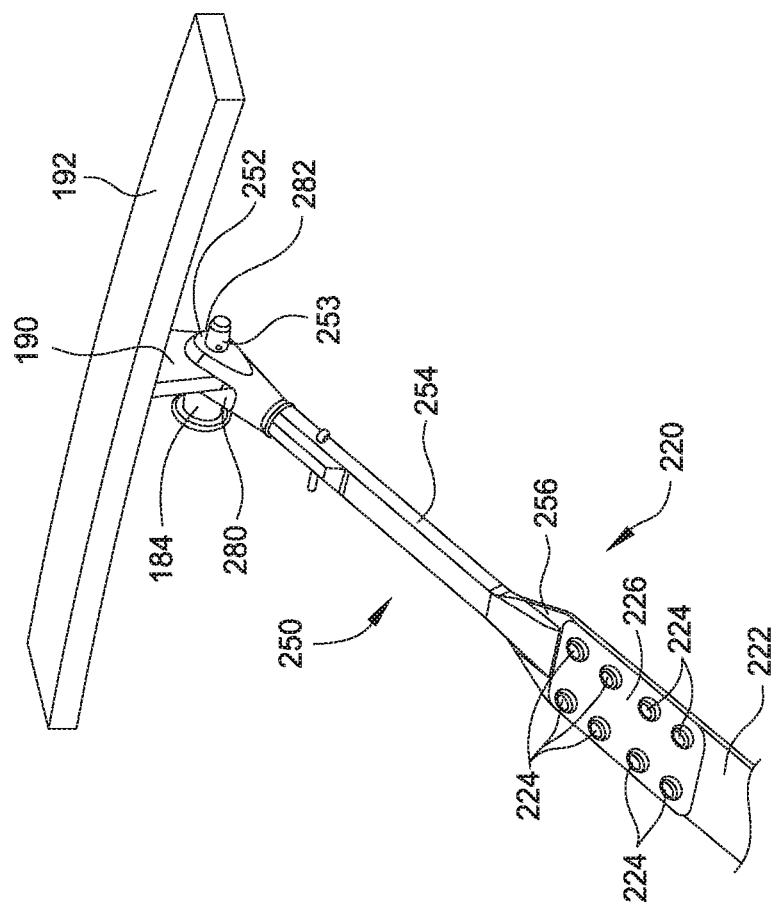
FIG. 9 is a detail perspective view of a clevis end of the tension-only member of FIG. 4.

FIG. 9 is a detail perspective view showing the clevis end 252 of the tension-only member 220 that is connected to a lug connector 190 on an upper frame member 192 (e.g., an upper rail segment, a vehicle frame member, or a vehicle skin). Clevis walls 280 of the clevis end 252 are arranged on either side of the lug connector 190. A quick release pin 184 or like fastener (e.g., a cotter pin or a split pin) is inserted through aligned holes to fasten the clevis end 252 and the lug connector 190.

In various aspects, a tension-only member 220 could have two lug ends 232, two clevis ends 252, or a lug end 232 and a clevis end 252. The particular configuration of the connector ends 230 and 250 of the tension-only member 220 can be determined based on the connectors of the truss structure 200.

FIG. 10 illustrates a simplified line drawing of the truss structure 200 that includes an upper support rail 122, which could be connected to frame members of a vehicle, such as an aircraft. As discussed above, in various aspects, the upper support rail 122 could be omitted such that the various tie rods and tension-only members are connected directly to frame and/or skin members of a vehicle. The truss structure 200 illustrated in FIG. 10 includes two diagonal tie rods 120 and three tension-only members 220. As discussed above with FIG. 2, the frame members of a vehicle are stretching in the direction of arrows Papp. As shown in FIG. 10, a first of the diagonal tie rods 120 is in tension (as indicated by arrows T) and a second of the diagonal tie rods 120 is in compression (as indicated by arrows C). The three tension-only members 220 in the truss structure 200 are in compression, but deflect as discussed above. The deflected tension-only members 220' are illustrated in a greatly exaggerated deflected manner by broken lines. Thus, the tension-only members 220 do not transmit significant loads from the upper support rail 122 to the lower support rail 102 or vice versa. As a result, the truss structure 200 can flex with the frame member(s) of the vehicle and not transmit significant loads to the frame member(s). As a result, the load Pr in the lower support rail 102 is lower than the load Pr in the lower support rail 102 in the truss structure 100 shown in FIG. 2. Also, the loads in the vertical tie rods 106 and the diagonal tie rods 120 in the truss structure 200 are lower than the loads in those tie rods in the truss structure 100.

Figure 11:
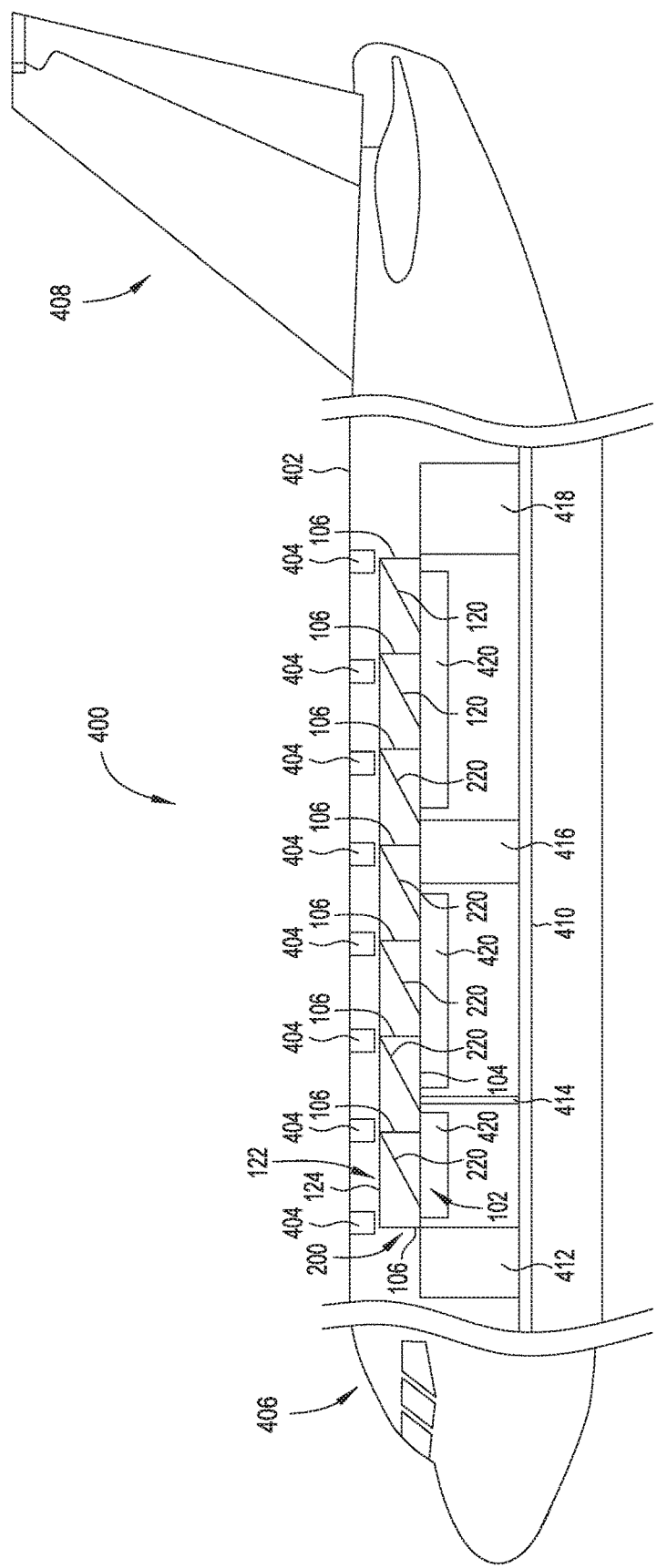
FIG. 11 is a cross-sectional side view of an aircraft with the truss structure of FIG. 3 supporting various structures in a passenger cabin of the aircraft.

FIG. 11 is a cross-sectional side view of an aircraft 400 in which the truss structure 200 is installed in a fuselage 402 of an aircraft. For reference, the flight deck area 406 of the aircraft 400 and the empennage 408 of the aircraft 400 are also shown. The fuselage 402 includes a floor 410 of a passenger cabin and frame members 404. The frame members 404 could be circumferential frame members or other radial structural members of the aircraft fuselage 402. The upper support rail 122 of the truss structure 200 is attached to the frame members 404 of the fuselage 402 and the lower support rails 102 of the truss structure 200 are connected to the upper support rails 122 via vertical support tie rods 106, diagonal tie rods 120, and tension-only members 220. As discussed above, in various aspects, the upper support rails 122 could be omitted such that the vertical tie rods 106, diagonal tie rods 120, and tension-only members 220 are connected directly to the frame members 404 and/or the skin of the fuselage 402 directly. The truss structure 200 also includes lateral tie rods 116, which are not shown in FIG. 11. The truss structure 200 illustrated in FIG. 11 includes two diagonal tie rods 120. In various other aspects, the truss structure 200 could include as few as one diagonal tie rod 120 or three or more diagonal tie rods 120. FIG. 11 illustrates several different monuments that are connected to the truss structure 200 for support. For example, FIG. 11 illustrates a lavatory 412 that is connected to the truss structure 200. FIG. 11 also illustrates a partition 414 that is connected to the truss structure 200. FIG. 11 also illustrates a closet 416 that is connected to the truss structure 200. FIG. 11 also illustrates a galley 418 that is connected to the truss structure 200. FIG. 11 also illustrates various overhead storage bins 420 that are connected to the truss structure 200.

When the aircraft 400 accelerates (e.g., during takeoff), the various monuments (e.g., the lavatory 412, the partition 414, the closet 416, the galley 418, and the overhead storage bins 420) exert a load on the truss structure 200 in an aft direction (i.e., toward the empennage 408). The diagonal tie rods 120 support this aft load from the monuments via compression in the diagonal tie rods 120. As discussed above, the tension-only members 220 do not support a substantial amount of compression loading and therefore do not support the aft load from the monuments. When the aircraft 400 decelerates (e.g., during landing when landing gear brakes and thrust reversers are applied), the various monuments exert a load on the truss structure 200 in a forward direction (i.e., toward the flight deck 406). The diagonal tie rods 120 and the tension-only members 220 support this forward load from the monuments via tension in the diagonal tie rods 120 and the tension-only members 220.

FIG. 12 illustrates another aspect of a tension-only member 500. The tension-only member 500 includes a cable or rope 522 in place of the leaf spring 222 discussed above. The cable or rope 522 could be made of braided metal strands, Kevlar strands, or other like materials. The cable or rope 522 is connected to the shanks 234 and 254 of the connector ends 230 and 250, respectively, via clamps 536 and 556. For example, clamps such as C cable clamps, manufactured by Allied Bolts Products, LLC, could be attached to the shanks 234 and 254 of the end connectors 230 and 250, respectively, and ends of the cable or rope 522 could be secured in the clamps. In various aspects, end of a metal cable could be welded or swaged to the shanks 234 and 254.

As discussed above, tension-only members 220 and/or 500 can be used in a truss structure to support loads in a first direction while providing flexibility to the truss in a second opposite direction. Such directional support can be advantageous when the truss is connected to a flexible structure, such as a vehicle frame. The directional support can enable the truss structure to flex with the flexible structure, thereby reducing loads imparted by the truss structure on to the flexible structure.

The descriptions of the various aspects have been presented for purposes of illustration, but are not intended to be exhaustive or limited to the aspects disclosed. Many modifications and variations will be apparent to those of ordinary skill in the art without departing from the scope and spirit of the described aspects. The terminology used herein was chosen to best explain the principles of the aspects, the practical application or technical improvement over technologies found in the marketplace, or to enable others of ordinary skill in the art to understand the aspects disclosed herein.

While the foregoing is directed to certain aspects, other and further aspects may be devised without departing from the basic scope thereof, and the scope thereof is determined by the claims that follow.

What is claimed is:

1. An aircraft truss support member, comprising:
   a first connector end;
   a second connector end; and
   a connector configured to support tensile loads and buckle under significant compressive loads, the connector comprising a leaf spring arranged between the first and second connector ends with a first end of the leaf spring connected to the first connector end and a second end of the leaf spring connected to the second connector end.

2. The support member of claim 1, wherein the leaf spring comprises at least one of: aluminum, steel, titanium, and carbon fiber reinforced plastic.

3. The support member of claim 1,
   further comprising first splice plates fastened to sides of the end of the first connector end and the first end of the leaf spring and second splice plates fastened to sides of the end of the second connector end and the second end of the leaf spring.

4. The support member of claim 1, wherein the first connector end comprises one of a clevis end and a lug end, and wherein the second connector end comprises one of a clevis end and a lug end.

5. The support member of claim 1, wherein the first connector end comprises a clevis end and the second connector end comprises a lug end.

6. An aircraft truss support structure, comprising:
   an upper support rail;
   a lower support rail;
   at least two vertical tie rods connecting the upper support rail and the lower support rail;
   a diagonal tie rod, wherein a first end of the diagonal tie rod is connected to the lower support rail proximal to the connection of a first vertical tie rod of the at least two vertical tie rods with the lower support rail, and wherein a second end of the diagonal tie rod extends away from the first vertical tie rod and is connected to the upper support rail; and
   a member, including:
      a first connector end;
      a second connector end; and
   a connector configured to support tensile loads and buckle under significant compressive loads, the connector comprising a leaf spring arranged between the first and second connector ends, wherein the member is arranged between the first vertical tie rod and a second vertical tie rod of the at least two vertical tie rods, wherein the first connector end of the member is connected to the lower support rail proximal to the connection of the second vertical tie rod with the lower support rail, and wherein the second connector end of the member extends away from the second vertical tie rod and is connected to the upper support rail between the connection of the first and second vertical tie rods with the upper support rail.

7. The truss support structure of claim 6, wherein the leaf spring comprises at least one of: aluminum, steel, titanium, and carbon fiber reinforced plastic.

8. The truss support structure of claim 6, wherein an end of the first connector end is aligned with a first end of the leaf spring in an end-to-end arrangement, wherein an end of the second connector end is aligned with a second end of the leaf spring in an end-to-end arrangement; and
further comprising first splice plates fastened to sides of the end of the first connector end and the first end of the leaf spring and second splice plates fastened to sides of the end of the second connector end and the second end of the leaf spring.

9. The truss support structure of claim 6, wherein the first connector end comprises one of a clevis end and a lug end, and wherein the second connector end comprises one of a clevis end and a lug end.

10. The truss support structure of claim 6, wherein the first connector end comprises a clevis end and the second end comprises a lug end.

11. The truss support structure of claim 6, further comprising at least one of: a galley, a lavatory, a closet, a partition, and an overhead storage bin supported by the lower support rail.

* * * * *